C. O. BLEE & C. BLACK.
HUSKING APPARATUS.
APPLICATION FILED DEC. 29, 1910.

1,000,984.

Patented Aug. 22, 1911.
2 SHEETS—SHEET 1.

Witnesses:

Inventors
Charles O. Blee
Charles Black
by
Attys

C. O. BLEE & C. BLACK.
HUSKING APPARATUS.
APPLICATION FILED DEC. 29, 1910.
1,000,984.
Patented Aug. 22, 1911.
2 SHEETS—SHEET 2.
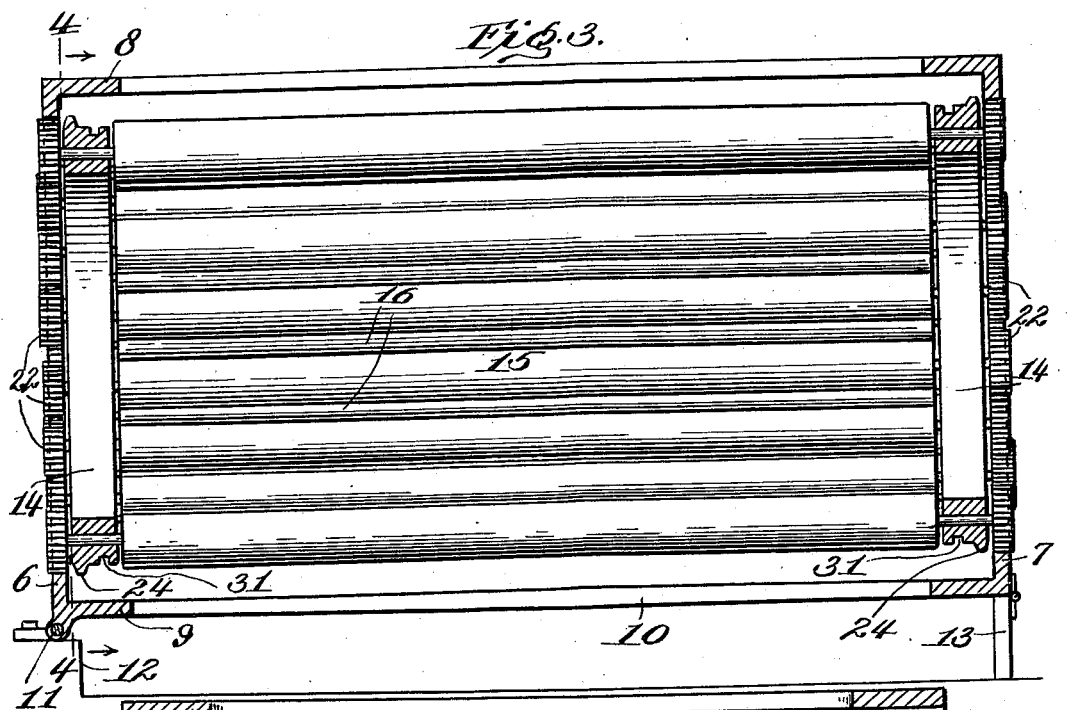
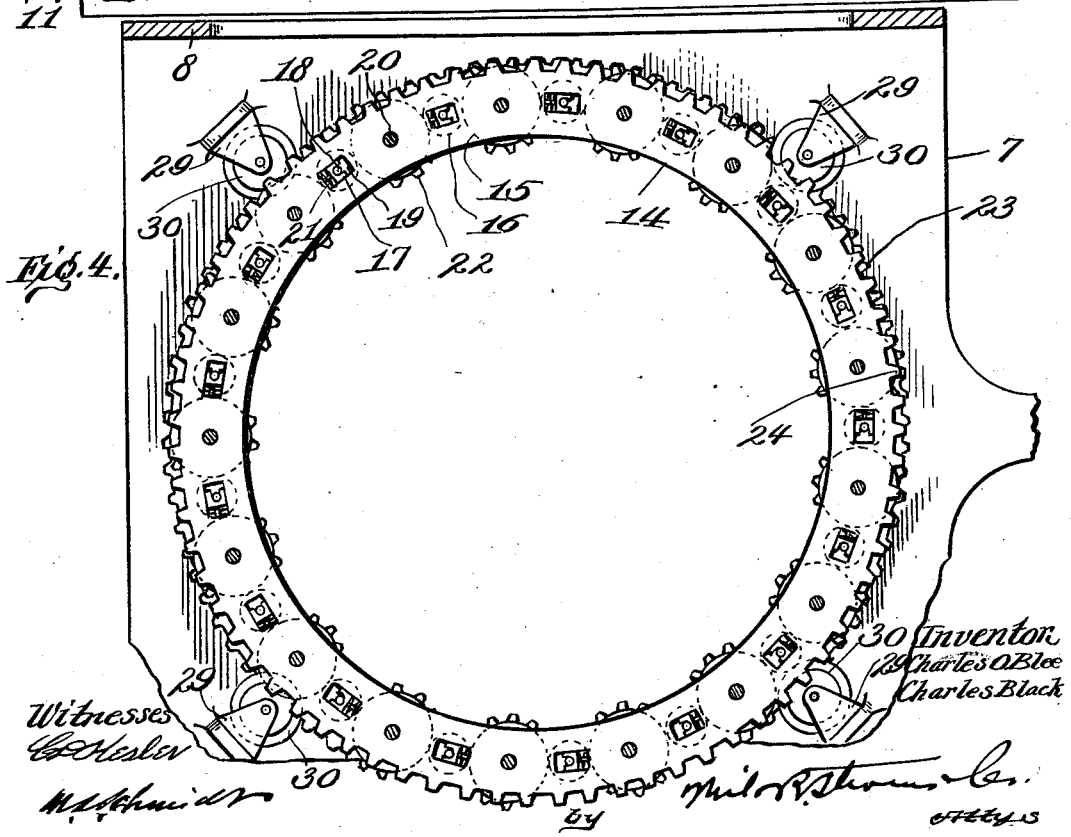

UNITED STATES PATENT OFFICE.

CHARLES O. BLEE AND CHARLES BLACK, OF ROANOKE, INDIANA.

HUSKING APPARATUS.

1,000,984.  Specification of Letters Patent.  Patented Aug. 22, 1911.

Application filed December 29, 1910. Serial No. 599,907.

*To all whom it may concern:*

Be it known that we, CHARLES O. BLEE and CHARLES BLACK, citizens of the United States, residing at Roanoke, in the county of Huntington and State of Indiana, have invented certain new and useful Improvements in Husking Apparatus, of which the following is a specification.

This invention relates to apparatus for removing the husks of corn, and it has for its object to provide a novel and improved device for this purpose, the same being characterized by a series of rollers arranged in a circle to form a drum, said rollers rotating about their own axes, and also revolving around the axis of the drum.

The invention also has for its object to provide certain novel and improved structural details to be hereinafter described and claimed.

In order that the invention may be better understood, reference is had to the accompanying drawings forming a part of this specification, in which drawings—

Figure 1:
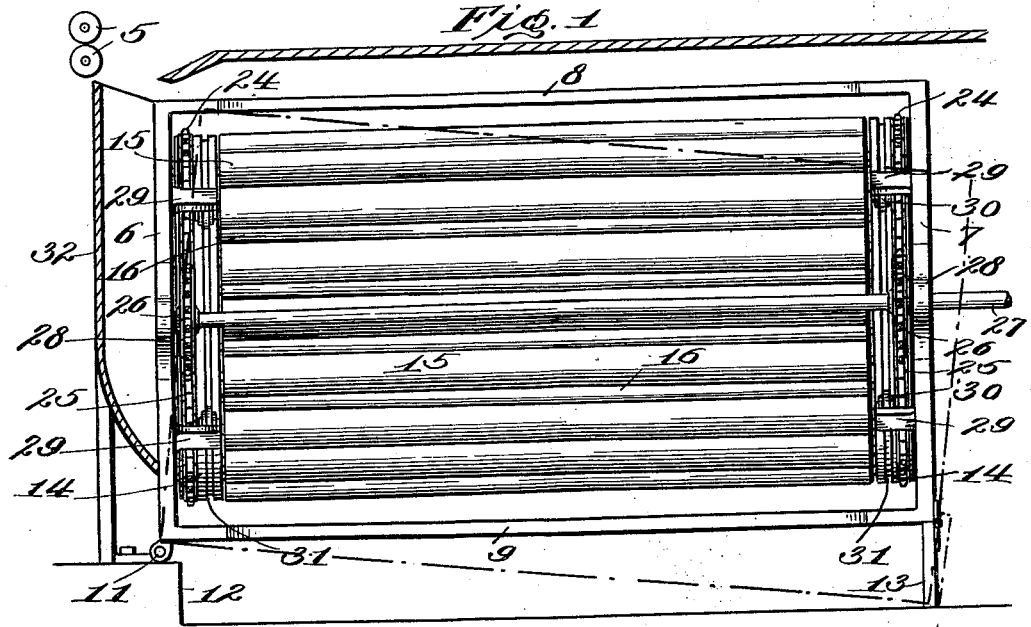
Figure 2:
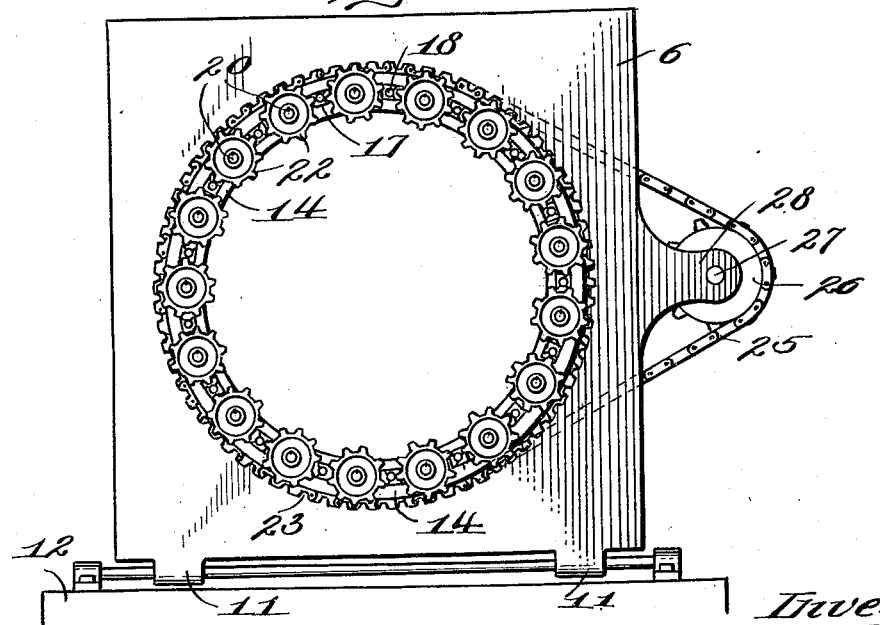

Figure 1 is a side elevation of the husking drum. Fig. 2 is an end view thereof. Fig. 3 is an enlarged longitudinal section of the drum. Fig. 4 is a cross-section on the line 4—4 of Fig. 3.

Referring specifically to the drawings, 5 denotes a pair of snapping rollers which are operated in the ordinary manner to strip the ears from the stalks, the latter being fed to the rollers by a suitable conveyer mechanism (not shown). The snapping rollers and the conveyer form no part of the present invention, in view of which a detailed description thereof is deemed unnecessary.

The husking apparatus which is the subject of the present invention comprises a supporting frame, and a revoluble husking drum mounted therein, said drum being horizontally disposed. The supporting frame comprises front and rear end walls 6 and 7, respectively, a top 8, and a bottom 9, the latter having an opening 10 through which the husks are discharged after being stripped from the ears. The frame is pivoted at its front lower end, as indicated at 11, to a suitable base 12, so that the frame and the parts carried thereby may be tilted downwardly toward the rear, as shown by dotted lines in Fig. 1. By thus tilting the parts, the passage of the ears through the drum is facilitated. An adjustable prop 13 supports the rear end of the frame. The husking drum is composed of a plurality of rollers which are arranged in a circle, and are supported at their ends by rings 14. The rollers extend in parallelism lengthwise between the rings, and they are arranged in pairs, the members of which are indicated at 15 and 16, respectively. The rollers 15 are driven by a gearing to be presently described, and their companion rollers 16 are idlers, they being held in contact with the rollers 15 by means of spring-pressed bearing boxes 17 in which the shafts 18 of said rollers 16 are journaled. The bearing boxes are mounted in pockets 19 formed in the rings 14, and the latter also have bearings in which the shafts 20 of the rollers 15 are journaled. Springs 21 backing up the boxes 17 yieldingly hold the rollers 16 pressed against their companion rollers 15. The shafts 20 extend beyond the outer faces of the rings 14, and said projecting ends of the shafts carry pinions 22 which are in mesh with internal gears 23 on the end walls 6 and 7, said internal gears being formed by making a circular opening in the end walls and providing the wall of said opening with gear teeth. The outer periphery of the rings 14 is formed with sprocket teeth 24 for drive chains 25, which latter also pass over sprocket wheels 26 mounted on a shaft 27 supported in bearings 28 carried by the end walls 6 and 7 of the supporting frame. In this manner driving means are applied to both ends of the drum. The sprocket wheels 26 are driven from any suitable source of power applied to the shaft 27.

To the inner faces of the walls 6 and 7 are secured brackets 29 which support antifriction rollers 30, which latter engage the outer periphery of the rings 14, said peripheries being grooved to one side of the teeth 24, as indicated at 31, and the treads of the rollers are flanged to fit in said grooves. In front of the wall 6 is located a chute 32 down which the ears drop, and are guided into the drum, after they are snapped off by the rolls 5.

In operation, the drum is revolved from the shaft 27 through the sprocket-and-chain gearing herein described, and this movement of the drum also imparts a rotary movement to the rollers 15 through the pinions 22 and the internal gears 23. The rollers 16 are also rotated by reason of their frictional contact with their companion rollers 15. It will therefore be evident that the rollers revolve about the axis of the drum, and also rotate about their own axes. The ears of corn, after they are snapped off the stalks by the rolls 5, drop down the chute 32 and are carried by the same into the front end of the drum. The husks are gripped between the rotating rollers and stripped off the ears, and the latter roll through the drum toward the rear end thereof from which they are discharged. The husks pass between the rollers, and drop from the drum through the opening 10 in the bottom 9 of the supporting frame. The motion of the drum causes the ears to roll around therein during their passage from one end to the other, so that after a portion of the husks is stripped off by one set of rollers, a new surface is presented to another set of rollers, and another portion of the husks is removed, and so on until the ears reach the rear end of the drum, the husks having by this time been entirely stripped off. The passage of the ears to the rear end of the drum is aided by the inclination of the latter.

The structure herein described effects a quick removal of the husks, and the ears are stripped clean without injury.

The preferred embodiment of the invention has been shown, but it will be understood that various changes in the structural details may be resorted to without departure from the invention.

We claim:

1. A husking apparatus comprising a revoluble drum composed of a circular series of rotatable rollers arranged in pairs, the members of said pairs rotating in opposite directions, means for revolving the drum, and means for rotating the rollers about their own axes.

2. A husking apparatus comprising a revoluble drum composed of a circular series of rotatable rollers, said rollers being arranged in pairs, one of the members of said pairs being in frictional contact with the other member, means for rotating the last-mentioned members of said pairs of rollers about their own axes, and means for revolving the drum.

3. A husking apparatus comprising a supporting frame, a revoluble drum mounted therein, said drum being composed of a circular series of pairs of rotatable rollers, rings supporting the rollers at their ends, the outer periphery of said rings being grooved, anti-friction rollers carried by the supporting frame, and working in said grooves, means for revolving the drum, and means for rotating the first-mentioned rollers about their own axes.

4. A husking apparatus comprising a supporting frame, a revoluble drum carried thereby, said drum being composed of a circular series of pairs of rotatable rollers, rings supporting the rollers at their ends, the outer periphery of said rings being toothed, driving means engageable with the teeth of the rings, whereby the drum is revolved, and means for rotating the rollers about their own axes.

5. A husking apparatus comprising a supporting frame having an internal gear, a revoluble drum mounted in said frame, said drum being composed of a circular series of rotatable rollers arranged in pairs, one of the members of said pairs being in frictional contact with the other members, driving means for the last-mentioned members, said driving means comprising sprocket wheels connected to said last-mentioned members, said sprocket wheels being in mesh with the aforesaid internal gear, and means for revolving the drum.

6. A husking apparatus comprising a plurality of husking devices arranged to form a drum which is open at its ends, a pivoted supporting frame for said drum, means for revolving the drum, and means for operating the husking devices constituting said drum.

In testimony whereof we affix our signatures in presence of two witnesses.

CHARLES O. BLEE.
CHARLES BLACK.

Witnesses:
JOHN R. HARTZELL,
CLARA C. RISSING.

Copies of this patent may be obtained for five cents each, by addressing the "Commissioner of Patents, Washington, D. C."